(12) United States Patent
Wong

(10) Patent No.: US 7,647,535 B2
(45) Date of Patent: Jan. 12, 2010

(54) USING A DELAY CLOCK TO OPTIMIZE THE TIMING MARGIN OF SEQUENTIAL LOGIC

(75) Inventor: Tak Kwong Wong, Milpitas, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 257 days.

(21) Appl. No.: 11/612,740

(22) Filed: Dec. 19, 2006

(65) Prior Publication Data

US 2008/0143383 A1 Jun. 19, 2008

(51) Int. Cl.
*G06K 5/04* (2006.01)
*G01R 31/28* (2006.01)
(52) U.S. Cl. ...................... 714/700; 714/724
(58) Field of Classification Search .................. 714/700, 714/707, 724, 725, 726, 731, 744, 798; 713/401, 713/600
See application file for complete search history.

(56) References Cited

U.S. PATENT DOCUMENTS 6,380,785 B2 * 4/2002 Fisher ........................ 327/269
6,757,779 B1 * 6/2004 Nataraj et al. ............... 711/108
7,089,473 B2 * 8/2006 Mates ......................... 714/733

* cited by examiner

*Primary Examiner*—Phung M Chung
(74) *Attorney, Agent, or Firm*—Bever, Hoffman & Harms

(57) ABSTRACT

A circuit including a first stage register that operates in response to a first clock having a period $T_{CYCLE}$, a programmable delay circuit that introduces a programmable delay to the first clock, thereby creating a second clock, a second stage register that operates in response to the second clock, combinational logic coupled between the first register output and the second register input, and a third register having an input coupled to the second register output. The programmable delay is selected: (1) to have a positive value if the signal delay between the first and second registers exceeds $T_{CYCLE}$, and (2) such that the signal delay between the second and third registers is less than $T_{CYCLE}$ minus the programmable delay. Additional delayed clocks generated in response to the second clock signal can be used to operate additional second stage registers, thereby staggering the outputs of these second stage registers within $T_{CYCLE}$.

28 Claims, 4 Drawing Sheets

USING A DELAY CLOCK TO OPTIMIZE THE TIMING MARGIN OF SEQUENTIAL LOGIC

FIELD OF THE INVENTION

The present invention relates to a method and structure for optimizing the timing margin in a system that implements sequential logic. More specifically, the present invention relates to a method and structure for using a delayed clock signal to shift the timing between various pipes of sequential logic.

RELATED ART

FIG. 1 is a block diagram illustrating a circuit 100 that includes input register 101, output register 102, and combinational logic 105. Input register 101 is located in a first timing block, and output register 102 is located in a second (subsequent) timing block. Input register 101 and output register 102 latch the input data values D1 and D2, respectively, in response to rising edges of a common clock signal (CLK). Input register 101 and output register 102 provide the latched data values as output data signals Q1 and Q2, respectively. The delay between the rising edge of the clock signal CLK and the time that the input register 101 provides the output data signal Q1 is referred to as the clock-to-output delay (or CLK-to-Q delay). Because input and output registers 101 and 102 operate in response to the clock signal CLK, these registers are generally referred to as sequential logic circuits.

Input register 101 provides the output data signal Q1 to combinational logic circuit 105. Combinational logic circuit 105, which is typically configured to receive other signals (not shown), includes non-clocked logic, such as inverters, logical AND circuits, logical NAND circuits, logical NOR circuits and/or logical OR circuits. Combinational logic circuit 105 provides the data signal D2 in response to the provided input signals, including the data signal Q1 provided by input register 101. The delay that exists between a transition in the data signal Q1 and a corresponding transition in the data signal D2 (i.e., the delay introduced by combinational logic circuit 105), is referred to as combinational logic delay.

The nature of synchronous sequential logic requires that the register-to-register delay be less than one cycle of the clock signal CLK. Stated another way, the CLK-to-Q delay of the input register 101 plus the combinational logic delay associated with combinational logic 105 must be less than the duration of one cycle of the clock signal CLK (e.g., one clock period, TCLK). As defined herein, the register-to-register delay is the delay existing from the input of input register 101 to the input of output register 102.

If the timing blocks including input register 101 and output register 102 are located far apart, the uncertainty in clock skew and signal RC delay will be relatively large, leaving less margin for the combinational logic delay. Furthermore, if both timing blocks are under simultaneous development, one of the timing blocks has to be finished first in order to obtain accurate timing information, which is then used to optimize the other timing block. In a tight timing situation, several rounds of iteration are typically required before the timing goals are achieved. These iterations will have a major impact on the development schedule. In the extreme case that the output data value Q2 provided by output register 102 is provided to a register (not shown) in a third timing block, it will take even longer to optimize the logic to meet all of the timing goals.

In addition, cross coupling capacitance between adjacent signal lines results in delay variations (delay error) when the associated signals switch together. This cross coupling capacitance can result in a glitch in a signal that has a weak drive and/or is transmitted on a long resistive wire. If the glitch is large enough to be interpreted as an incorrect logic state by downstream logic, a logic error (glitch error) can occur.

Designers have attempted to overcome the above-described problems as follows. A register-to-register delay longer than one cycle of the clock signal CLK is typically resolved by logic partitioning. That is, part of the combinational logic circuit 105 is moved either before input register 101, or after output register 102, thereby reducing the register-to-register delay between input register 101 and output register 102. However, moving a part of combinational logic circuit 105 in this manner typically increases the register-to-register delay at the input of input register 101 (upstream) or the output of output register 102 (downstream). The increased register-to-register delay in the upstream or downstream circuitry may cause the register-to-register delay associated with the upstream or downstream circuitry to become longer than one cycle of the clock signal CLK, thereby requiring further partitioning.

Moreover, moving part of the combinational logic circuit 105 upstream of input register 101 or downstream of output register 102 may result in the use of many more registers. For example, moving part of the combinational logic of a decoding logic circuit downstream (or moving part of the combinational logic of an encoding circuit upstream) would undesirably require the addition of many additional registers.

Delay & glitch error resulting from the cross-coupling capacitance between adjacent signal lines have been avoided by re-routing the signal lines, such that the 'victim' signal lines are located away from the 'aggressor' signal lines. However, in the case of a massive parallel data path, this technique is not useful because all of the signal lines in the parallel data path are switching together. Other approaches have various disadvanges and limitations. Increasing the driver strength on the 'victi' signal lines is not an effective scheme for long signal lines, and causes more problems when the 'victim' signal lines become the 'aggressor' signal lines when it is their turn to switch. Increasing the signal line width will increase the capacitance, and hence increase the power and path delay. Increasing the signal line spacing will increase the area consumption and possibly the wire length.

It would therefore be desirable to have an improved method and structure for controlling register-to-register delay and cross-coupling capacitance between adjacent signal lines.

SUMMARY

Accordingly, the present invention provides a sequential logic circuit including a first stage register, a second stage register and a third stage register. The first stage register operates in response to a first clock signal having a period $T_{CYCLE}$. Combinational logic is located between the first stage register and the second stage register. A programmable delay circuit is configured to selectively introduce a programmable delay to the first clock signal, thereby creating a delayed clock signal. The second stage register operates in response to the delayed clock signal. If the signal delay from the first stage register to the second stage register (i.e., the register-to-register delay) exceeds $T_{CYCLE}$, then the programmable delay circuit is controlled to introduce a positive programmable delay to the first clock signal. The positive programmable delay is selected to exceed the time by which the register-to-register delay exceeds $T_{CYCLE}$ by at least the set up time of the second register. The positive programmable delay must also be selected such that the signal delay between the second and third registers is less than $T_{CYCLE}$ minus the programmable delay. Introducing the programmable delay in this manner eliminates the need to move portions of the combinational logic before the first stage registers or after the second stage registers.

One or more additional clock signals having fixed delays with respect to the programmable delayed clock signal can also be generated. These fixed delay clock signals are used to operate additional second stage registers, such that the outputs of the various second stage registers transition in a staggered pattern, thereby minimizing signal cross-coupling.

The present invention will be more fully understood in view of the following description and drawings.

DETAILED DESCRIPTION

Figure 1:
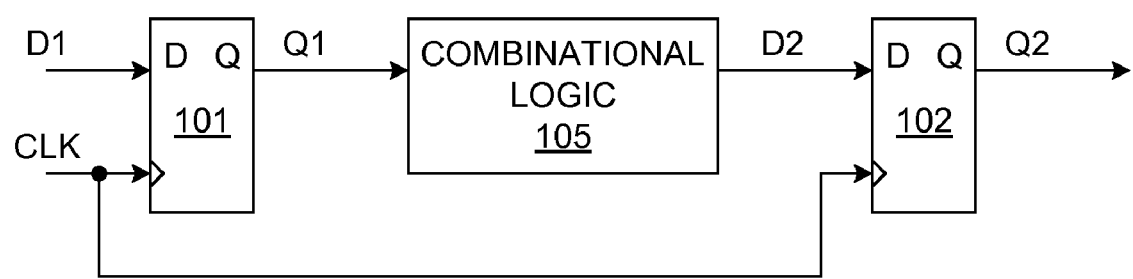
FIG. 1 is a block diagram of conventional sequential logic elements located in separate timing blocks, with combinational logic located therebetween.
Figure 2:
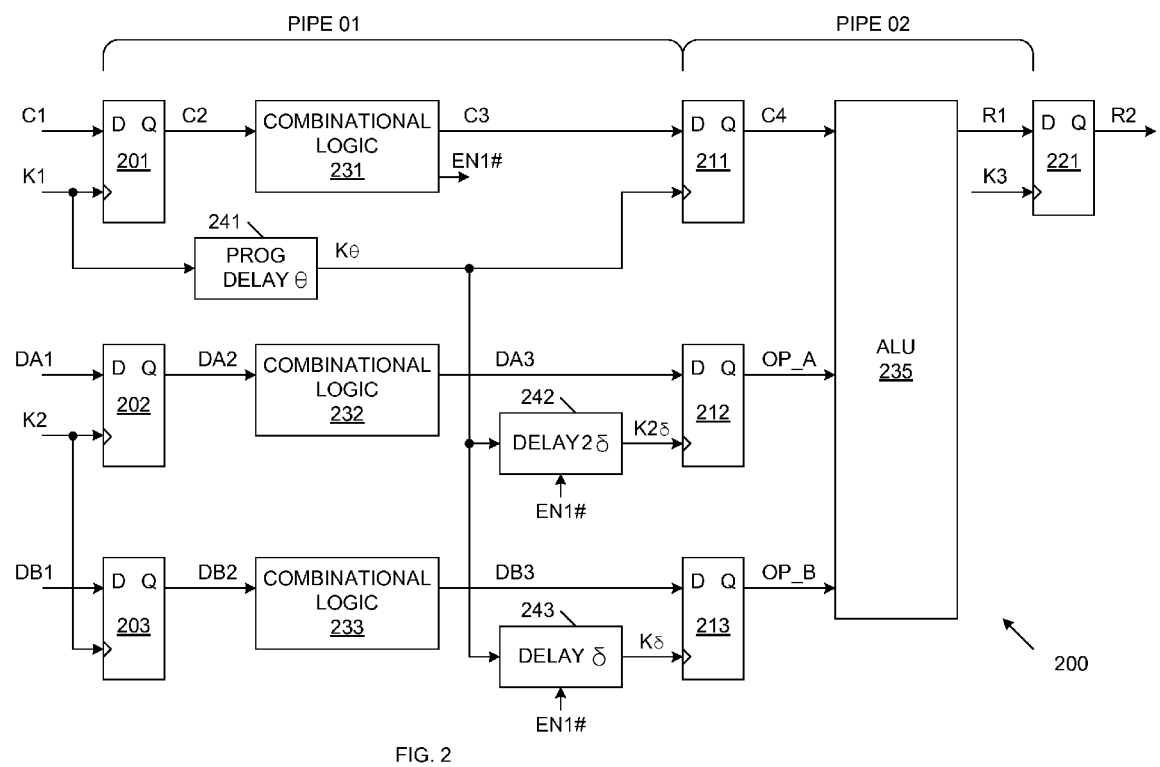
FIG. 2 is a block diagram of a sequential logic circuit in accordance with one embodiment of the present invention.

FIG. 2 is a block diagram of a sequential logic circuit 200 in accordance with one embodiment of the present invention. Timing circuit 200 includes first stage registers 201-203, second stage registers 211-213, third stage register 221, combinational logic circuits 231-233, arithmetic logic unit (ALU) 235, programmable clock delay circuit 241, and fixed clock delay circuits 242 and 243. Sequential logic circuit includes a control path (which includes register 201, combinational logic 231 and register 211), a first data path (which includes register 202, combinational logic 232 and register 212), and a second data path (which includes register 203, combinational logic 233 and register 213). A first timing block (pipe 01) is defined from the inputs of registers 201-203 to the inputs of registers 211-213. A second timing block (pipe 02) is defined from the inputs of registers 211-213 to the input of register 221.

Control register 201 and programmable delay circuit 241 are coupled to receive a first clock signal K1. Data registers 202 and 203 are coupled to receive a second clock signal K2. In the described embodiment, the second clock signal K2 has the same frequency as the first clock signal K1, but is slightly delayed with respect to the first clock signal K1 because of physical clock tree skew. In other embodiments, the first and second clock signals K1 and K2 are identical clock signals.

A command value C1 is latched into command register 201 in response to an edge (e.g., a rising edge) of the first clock signal K1. In response, command register 201 provides an output command value C2 to combinational logic 231. Combinational logic 231 then provides a command value C3 to the input of register 211. Register 211 latches the command value C3 into command register 211 in response to an edge (e.g., a rising edge) of clock signal Kθ.

Clock signal Kθ is provided by programmable delay circuit 241 in response to the first clock signal K1. If the clock-to-output delay ($D_{201}$) of register 201 plus the combinational logic delay ($D_{231}$) of combinational logic 231 (i.e., the register-to-register delay from register 201 to register 211) is less than or equal to the period ($T_{K1}$) of the first clock signal K1, then programmable delay circuit 241 is disabled, such that no significant delay is introduced to the first clock signal K1 (i.e., K1=Kθ).

However, if the register-to-register delay from register 201 to register 211 is greater than the period $T_{K1}$ of the first clock signal K1, then programmable delay circuit 241 can be enabled, such that a positive programmable delay θ is introduced to the first clock signal K1. The programmable delay θ is selected such that the command value C3 is valid before the corresponding edge of the delayed first clock signal Kθ activates command register 211. That is, the programmable delay θ is selected such that the period $T_{K1}$ of the first clock signal K1 plus the programmable delay θ is greater than or equal to the register-to-register delay from register 201 to register 211.

Introducing a positive programmable delay θ to the first clock signal K1 changes the timing requirements for the next timing block (i.e., pipe 02). More specifically, the allowable register-to-register delay from register 211 to register 221 must be less than the period $T_{K1}$ of the first clock signal K1, minus the programmable delay θ. Note that if this timing problem were solved in a conventional manner, by moving part of combinational logic 231 after register 211, the delay path of the next timing block (pipe 02) would be increased. Hence, the programmable delay θ introduced to the first clock signal K1 does not really tighten the timing requirement for the next timing block (pipe 02) when compared with the conventional alternative.

Figure 3:
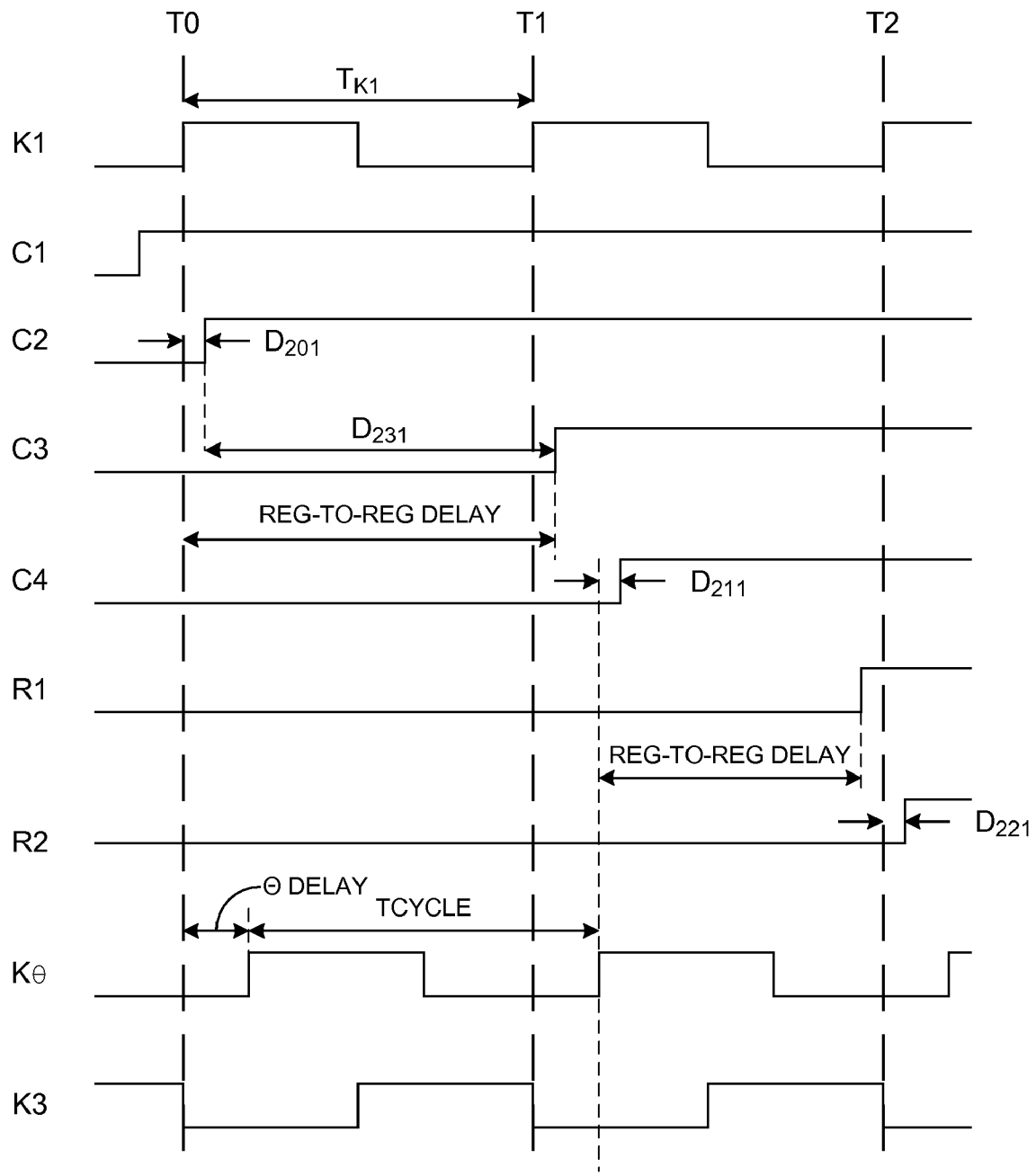
FIG. 3 is a waveform diagram illustrating the timing of a control path within the sequential logic circuit of FIG. 2 in accordance with one embodiment of the present invention.

FIG. 3 is a waveform diagram illustrating the timing of the control path in accordance with one embodiment of the present invention. At time T0, the first clock signal transitions to a logic high state, thereby causing command register 201 to latch the command value C1. After clock-to-out delay $D_{201}$, command register 201 provides a valid output command value C2. Combinational logic 231 provides a valid command value C3 after the combinational logic delay $D_{231}$. In the example of FIG. 3, the clock-to-out delay $D_{201}$ plus the combinational logic delay $D_{231}$ is greater than the period $T_{K1}$ of the first clock signal K1. Thus, command value C3 does not become valid until after the rising edge of the first clock signal K1 occurs at time T1. Consequently, programmable delay circuit 241 is controlled to introduce programmable delay θ, thereby creating delayed clock signal Kθ. In one embodiment, programmable delay θ is selected in response to the contents of a register.

As illustrated in FIG. 3, the programmable delay θ is selected such that the rising edge of clock signal Kθ occurs after control value C3 has become valid. The rising edge of clock signal Kθ (after time T1) causes command register 211 to latch the command value C3. After clock-to-out delay $D_{211}$ (associated with command register 211), command register 211 provides a valid output command value C4. Note that ALU 235 must provide the result R1 associated with command value C4 prior to time T2 in order to meet the timing requirements. The falling edge of clock signal K3 (after time T1) causes output register 221 to latch the result R1. After clock-to-out delay $D_{221}$ (associated with output register 221), output register 221 provides a valid output result R2. In this manner, delayed clock signal Kθ effectively distributes the timing requirements of the control path over the first and second timing blocks (pipe 01 and pipe 02).

If the command value C1 is received from another logic block and the command value C4 is transmitted to yet another logic block, the input and output timing specifications will require more margin for clock skew and uncertainty (based on the large delay introduced by long input and output signal lines). In one embodiment, the programmable delay θ is at least partially metal layer programmable to allow for last minute adjustments of the programmable delay θ, when timing information associated with the other logic blocks becomes available.

Turning now to the first and second data paths, the first and second data values DA1 and DB1 are latched into data registers 202 and 203, respectively, in response to an edge (e.g., a rising edge) of the second clock signal K2. In response, data registers 202 and 203 provide latched data values DA2 and DB2, respectively, to combinational logic circuits 232 and 233, respectively. In response, combinational logic circuits 232 and 233 provide data values DA3 and DB3, respectively, to the inputs of data registers 212 and 213, respectively. Data registers 212 and 213 latch the data values DA3 and DB3, respectively, in response to edges (e.g., rising edges) of delayed clock signals K2δ and Kδ, respectively.

Delayed clock signals K2δ and Kδ are provided by fixed delay circuits 242 and 243, respectively, in response to the clock signal Kθ. Fixed delay circuits 242 and 243 introduce delays of 2δ and δ, respectively, to clock signal Kθ. That is, the delay introduced by delay circuit 242 is twice the delay introduced by delay circuit 243.

Within the second timing block (pipe 02), registers 211, 212 and 213 provide a latched command value C4, a latched operand OP_A and a latched operand OP_B, respectively, in response to the clock signals Kθ, K2δ and Kδ, respectively. Command value C4 and operands OP_A and OP_B are provided to ALU 235. In response, ALU 235 generates a result R1, which is provided to an input of register 221. Register 221 operates in response to a third clock signal K3. In the described embodiment, the third clock signal K3 is the inverse of the first clock signal K1.

In the past, if command value C4 and operands OP_A and OP_B were required to travel a long distance to the same destination, cross-coupling of these signals would have been unavoidable. However, in accordance with one aspect of the present invention, operand OP_B has an extra delay of δ with respect to command value C4, and operand OP_A has an extra delay of 2δ with respect to command value C4 (and an extra delay of δ with respect to operand OP_B). The delay δ is selected such that command value C4 is fully transitioned to the next state before operand OP_B starts to transition (e.g., command value C4 reaches 90% of the Vcc supply voltage on a zero-to-one transition when (or before) operand OP_B reaches 90% of $V_{cc}$ on a one-to-zero transition). Selecting the delay δ in this manner also ensures that operand OP_B is fully transitioned to the next state before operand OP_A starts to transition. In this manner, the registers of the control path, the first data path and the second data path are effectively divided into three groups, each operating in response to a slightly different clock signal.

By dividing the registers 211-213 into two or more groups (three groups in the present embodiment), and interleaving the output signals from the different register groups, signal cross-coupling can be avoided. Note that the register-to-register delay from register 212 to register 221 must be less than the period $T_{K1}$ of the first clock signal K1 by delay 2δ. Similarly, the register-to-register delay from register 213 to register 221 must be less than the period $T_{K1}$ of the first clock signal K1 by delay δ.

The division of the registers 211-213 into different groups makes clock gating more flexible and more efficient. In the embodiment of FIG. 2, combinational logic 231 provides a delay enable signal EN1#, which can be used to enable and disable the delayed clock signals K2δ and Kδ on a per cycle basis.

Figure 4:
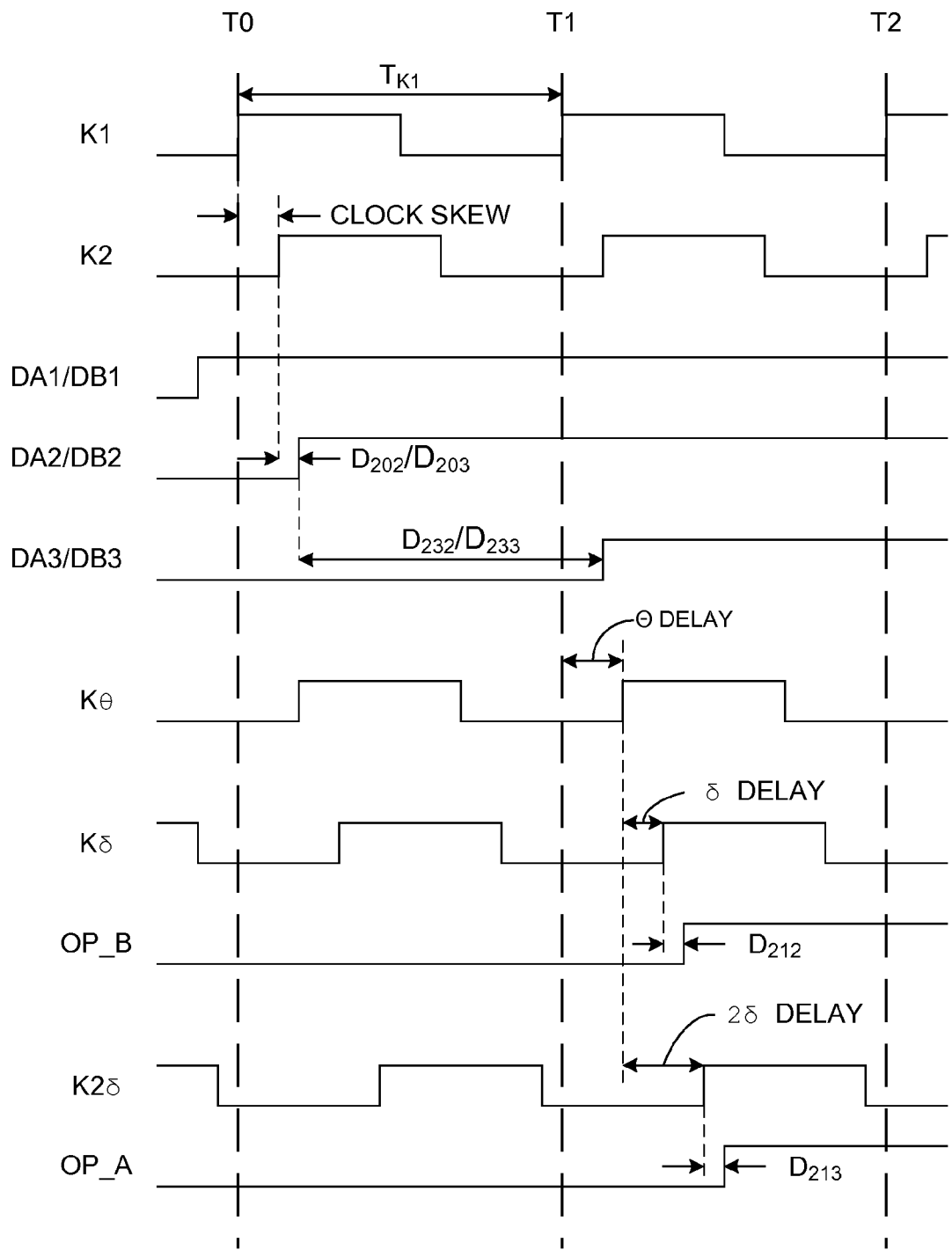
FIG. 4 is a waveform diagram illustrating the timing of a data path within the sequential logic circuit of FIG. 2 in accordance with one embodiment of the present invention.

FIG. 4 is a waveform diagram illustrating the timing of the first and second data paths in accordance with one embodiment of the present invention. FIG. 4 illustrates the same time period as FIG. 3. At time T0, the first clock signal K1 transitions to a logic high state. After a clock skew delay, the second clock signal K2 transitions to a logic high state, thereby causing data registers 202 and 203 to latch the input data values DA1 and DB1, respectively. After respective clock-to-out delays $D_{202}$ and $D_{203}$, data registers 202 and 203 provide valid output data values DA2 and DB2, respectively. Combinational logic circuits 232 and 233 provide valid data values DA3 and DB3 after combinational logic delays $D_{232}$ and $D_{233}$.

As illustrated in FIG. 4, fixed delay circuits 242 and 243 introduce delay 2δ and delay δ, respectively, to clock signal Kθ, thereby creating clock signals K2δ and Kδ, respectively. The rising edge of clock signal Kδ occurs (a delay δ) after the rising edge of clock signal Kθ. The rising edge of the clock signal Kδ causes data register 212 to latch the input data value DA3. After an associated clock-to-out delay $D_{212}$, data register 212 provides valid operand value OP_B.

The rising edge of clock signal K2δ occurs (a delay 2δ) after the rising edge of clock signal Kθ. The rising edge of the clock signal K2δ causes data register 213 to latch the input data value DB3. After an associated clock-to-out delay $D_{213}$, data register 213 provides valid operand value OP_A. Again, note that ALU 235 must provide result R1 in response to command value C4 and operand values OP_A and OP_B prior to time T2.

Benefits of the present invention include the following. In general, delaying clock signal Kθ (and thereby clock signals K2δ and Kδ) has the benefit of adjusting/controlling the timing of multiple registers. That is, adjusting clock signal Kθ replaces the need of adjusting the timing of all of the data and control signals going through the registers.

In addition, the present invention eliminates the need to move portions of the combinational logic 231-233 to the left of registers 201-203, or to the right of registers 211-213 (FIG. 2), because the present invention can fix the timing boundary. This is particularly beneficial for custom implementation of sequential logic, as the design cycle for this type of implementation is much longer than place and route implementation. Moreover, the programmable delay θ can be register programmable, which enables silicon debugging/prototyping without requiring expensive silicon re-spin. In addition, in high speed applications, where the process is pushed to the limit, programmable delay θ can be fuse programmable, thereby achieving highest yield to fastest speed grade.

The present invention also provides improved adaptation to highly uncertain logic delay & clock skew. The burden of such uncertainty is shared by more than one pipe of logic. By avoiding pushing the timing limit on only one pipe of logic, adjusting the programmable delay θ can achieve a better yield to fastest speed grade. In a case where only one register is involved from the input of a timing block to the output of the timing block, the programmable delay θ can shift the margin from the input interface to the output interface & vice versa.

In addition, dividing the registers within a timing block into groups with small delays between the groups has various benefits. For example, the signals in the critical path that needs fastest clock to output (e.g., the command path in FIG. 2) are not slowed down by cross coupling as long as the neighboring signals are in another register group. With more than one register group, an output signal can always be located adjacent to two neighboring signals that are not switching at the same time as the output signal. Hence, delay error can be avoided. With more than two register groups, an output signal can always be located adjacent to two neighboring signals that are not switching at the same time as each other, or at the same time as the output signal. Hence, the worst case glitch from a neighboring signal is reduced by 50 percent. In other words, signal lines can run in parallel for a length two times as long as a conventional design.

Dividing the registers into separately clocked groups also enables a fine grain clock gating scheme, which saves more power. Moreover, staggering the register switching reduces current surge/spike, because the switching is spread out over time. This in turn will reduce the power surge and IR drop in the power grid.

Although the present invention has been described in connection with several embodiments, it is understood that this invention is not limited to the embodiments disclosed, but is capable of various modifications which would be apparent to one of ordinary skill in the art. For example, although the second timing block (pipe 02) has been illustrated as a generic ALU 235 that receives command C4 and operands OP_A and OP_B as inputs, it is understood that the logic in the first timing block (pipe 01) can be repeated in the second timing block in other embodiments. That is, the logic of the first timing block (pipe 01) can be invoked in any timing block, as needed. Thus, the invention is limited only by the following claims.

I claim:

1. A sequential logic circuit comprising:
   a first register configured to operate in response to a first clock signal;
   a programmable delay circuit configured to introduce a programmable delay to the first clock signal, thereby creating a second clock signal;
   a second register configured to operate in response to the second clock signal;
   a first combinational logic circuit coupled between an output of the first register and an input of the second register; and
   means for increasing the programmable delay to a positive value if a first signal delay from an input of the first register to the input of the second register exceeds one cycle of the first clock signal.

2. The sequential logic circuit of claim 1, wherein the positive value exceeds the amount by which the first signal delay exceeds one cycle of the first clock signal, and wherein the positive value is less than one cycle of the first clock signal.

3. The sequential logic circuit of claim 1, wherein the positive value exceeds the amount by which the first signal delay exceeds one cycle of the first clock signal by at least a set up time of the second register.

4. The sequential logic circuit of claim 1, further comprising a third register having an input coupled to an output of the second register, wherein a second signal delay from the input of the second register to the input of the third register is less than one cycle of the first clock signal.

5. The sequential logic circuit of claim 4, wherein the second signal delay is less than one cycle of the first clock signal by at least the first signal delay.

6. The sequential logic circuit of claim 1, wherein the programmable delay circuit comprises a register-based circuit that introduces the programmable delay based on one or more values stored in a delay register.

7. The sequential logic circuit of claim 1, wherein the programmable delay circuit comprises a fuse-programmable circuit.

8. The sequential logic circuit of claim 1, wherein the second clock signal and the first clock signal are identical.

9. A sequential logic circuit comprising:
   a first register configured to operate in response to a first clock signal;
   a programmable delay circuit configured to introduce a programmable delay to the first clock signal, thereby creating a second clock signal;
   a second register configured to operate in response to the second clock signal;
   a first combinational logic circuit coupled between an output of the first register and an input of the second register; and
   means for bypassing the programmable delay circuit if a first signal delay from an input of the first register to the input of the second register is less than one cycle of the first clock signal.

10. The sequential logic circuit of claim 1, further comprising:
    a third register having an input coupled to an output of the second register; and
    a second combinational logic circuit coupled between the output of the second register and the input of the third register.

11. A sequential logic circuit comprising:
    a first register configured to operate in response to a first clock signal;
    a programmable delay circuit configured to introduce a programmable delay to the first clock signal, thereby creating a second clock signal;
    a second register configured to operate in response to the second clock signal;
    a first combinational logic circuit coupled between an output of the first register and an input of the second register;
    a third register having an input coupled to an output of the second register;
    a fourth register configured to operate in response to a third clock signal;
    a first fixed delay circuit configured to introduce a first fixed delay to the second clock signal, thereby creating a fourth clock signal;
    a fifth register configured to operate in response to the fourth clock signal, wherein an output of the fifth register is coupled to an input of the third register; and
    a second combinational logic circuit coupled between an output of the fourth register and an input of the fifth register.

12. The sequential logic circuit of claim 11, wherein the first fixed delay is selected such that an output of the second register is fully transitioned in response to the second clock signal before an output of the fifth register starts to transition in response to the fourth clock signal.

13. The sequential logic circuit of claim 11, further comprising:
    a sixth register configured to operate in response to the third clock signal;
    a second fixed delay circuit configured to introduce a second fixed delay, larger than the first fixed delay, to the second clock signal, thereby creating a fifth clock signal;
    a seventh register configured to operate in response to the fifth clock signal, wherein an output of the seventh register is coupled to an input of the third register; and
    a third combinational logic circuit coupled between an output of the sixth register and an input of the seventh register.

14. The sequential logic circuit of claim 13, wherein the second fixed delay is twice the first fixed delay.

15. The sequential logic circuit of claim 13, wherein the first fixed delay is selected such that an output of the second register is fully transitioned in response to the second clock signal before an output of the fifth register starts to transition in response to the fourth clock signal, and wherein the second fixed delay is selected such that an output of the fifth register is fully transitioned in response to the fourth clock signal before an output of the seventh register starts to transition in response to the fifth clock signal.

16. A circuit comprising:
a first sequential logic circuit that operates in response to a first clock signal;
a first combinational logic circuit coupled to the first sequential logic circuit, wherein a signal path from an input of the first sequential logic circuit to an output of the first combinational logic circuit exhibits a first signal delay greater than a period of the first clock signal;
a programmable delay circuit that introduces a first delay to the first clock signal to create a second clock signal; and
a second sequential logic circuit coupled to receive the output of the first combinational logic circuit and the second clock signal, wherein the second sequential logic circuit registers the output of the first combinational logic circuit in response to the second clock signal.

17. The circuit of claim 16, wherein the period of the first clock signal plus the first delay is greater than or equal to the first signal delay.

18. The circuit of claim 17, further comprising:
a second combinational logic circuit coupled to the second sequential logic circuit, wherein a signal path from an input of the second sequential logic circuit to an output of the second combinational logic circuit exhibits a second signal delay less than a period of the first clock signal; and
a third sequential logic circuit coupled to receive the output of the second combinational logic circuit and the first clock signal, wherein the third sequential logic circuit registers the output of the second combinational logic circuit in response to the first clock signal.

19. The circuit of claim 16, wherein the sum of the first signal delay and the second signal delay is less than or equal to two cycles of the first clock signal.

20. The circuit of claim 17, further comprising:
a first fixed delay circuit that introduces a first fixed delay to the second clock signal to create a third clock signal; and
a third sequential logic circuit that operates in response to the third clock signal, wherein the second and third sequential logic circuits are located at inputs of a common timing block.

21. The circuit of claim 20, further comprising:
a second fixed delay circuit that introduces a second fixed delay, different than the first fixed delay, to the second clock signal to create a fourth clock signal; and
a fourth sequential logic circuit that operates in response to the fourth clock signal, wherein the second, third and fourth sequential logic circuits are located at inputs of a common timing block.

22. A method comprising:
operating a first sequential logic circuit in response to a first clock signal;
applying a signal from the first sequential logic circuit to a first combinational logic circuit, wherein a signal path from an input of the first sequential logic circuit to an output of the first combinational logic circuit exhibits a first signal delay greater than a period of the first clock signal;
introducing a first delay to the first clock signal to create a second clock signal; and
storing a signal on the output of the first combinational logic circuit in a second sequential logic circuit in response the second clock signal.

23. The method of claim 22, wherein the period of the first clock signal plus the first delay is greater than or equal to the first signal delay.

24. The method of claim 23, further comprising:
applying a signal from the second sequential logic circuit to a second combinational logic circuit, wherein a signal path from an input of the second sequential logic circuit to an output of the second combinational logic circuit exhibits a second signal delay less than a period of the first clock signal; and
storing a signal on the output of the second combinational logic circuit in a third sequential logic circuit in response to the first clock signal.

25. The method of claim 24, wherein the sum of the first signal delay and the second signal delay is less than or equal to two periods of the first clock signal.

26. The method of claim 22, wherein the first delay is less than the period of the first clock signal.

27. The method of claim 22, further comprising:
introducing a second delay to the second clock signal to create a third clock signal; and
storing a signal on an input of a third sequential logic circuit in response to the third clock signal; and
operating the second and third sequential logic circuits as inputs of a common timing block.

28. The method of claim 27, further comprising:
introducing a third delay, different than the second delay, to the second clock signal to create a fourth clock signal; and
storing a signal on an input of a fourth sequential logic circuit in response to the fourth clock signal; and
operating the third and fourth sequential logic circuits as inputs of the common timing block.

* * * * *